Figure 1:
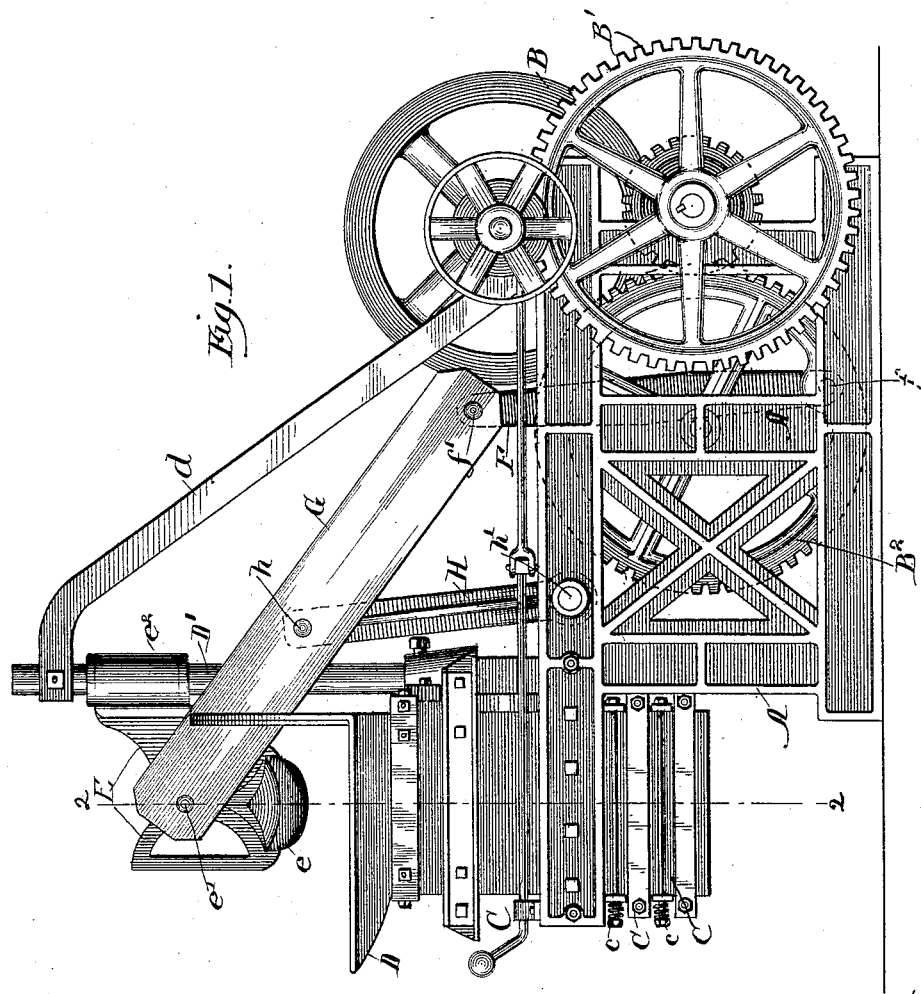

(No Model.) 2 Sheets—Sheet 1.

A. WICKEY.
BALING PRESS.

No. 487,503. Patented Dec. 6, 1892.

Witnesses:
Charles O. Shervey
Gerald Mahoney

Inventor:
Andrew Wickey
By Wiles, Grow & Bitner
Attys.

(No Model.) 2 Sheets—Sheet 2.

A. WICKEY.
BALING PRESS.

No. 487,503. Patented Dec. 6, 1892.

Witnesses:
Charles O. Sherwy.
Gerald Mahony.

Inventor:
Andrew Wickey
By Wiles, Greene & Bitner
Attys.

United States Patent Office.

ANDREW WICKEY, OF CHICAGO, ILLINOIS.

BALING-PRESS.

SPECIFICATION forming part of Letters Patent No. 487,503, dated December 6, 1892.

Application filed February 26, 1892. Serial No. 422,887. (No model.)

*To all whom it may concern:*

Be it known that I, ANDREW WICKEY, a citizen of the United States of America, residing at Chicago, in the county of Cook and State of Illinois, have invented certain new and useful Improvements in Baling-Presses, of which the following is a specification.

My invention relates to a baling-press designed for the purpose of baling scraps of tin, sheet brass, copper, or similar materials, for the baling of which the ordinary forms of presses used for hay, cotton, or the like are not adapted. Materials of this sort may, if properly compressed, be formed into bales which will retain their shape and hold together without the use of ties such as are necessary upon bales of almost any other material; and it is my object, besides adapting the press to the baling of said articles, to also enable it to compress them in such a way and form bales or blocks so bound together that they will hold without the addition of any other means for retaining them in shape.

To such end my invention consists in certain changes in the form, arrangement, and mode of operation of the press, which constitute important improvements in a press designed for use as stated above.

The preferred form in which my invention has been embodied is illustrated in the drawings by means of five figures, of which—

Figure 2:
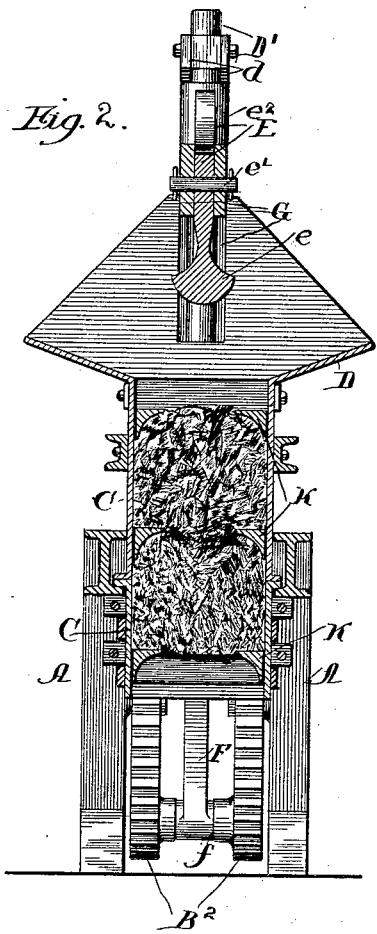
Figure 4:
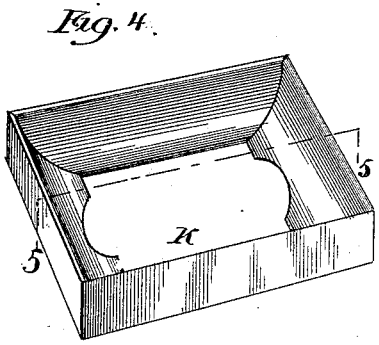
Figure 5:
Figure 3:
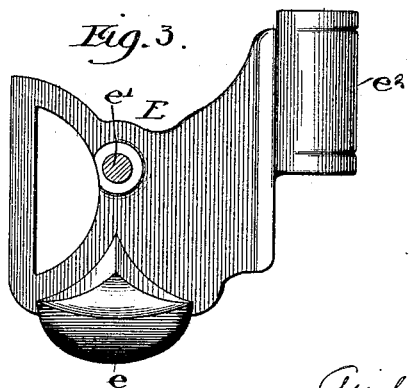

Figure 1 is a side elevation of the same; Fig. 2, a front view of a section taken in line 2 2 of Fig. 1; Fig. 3, a detail view of the plunger or beater; Fig. 4, a perspective of the division-block, and Fig. 5 a section in line 5 5 of Fig. 4.

The press as thus shown is supported upon a solid frame A, provided with suitable driving-gear B B' B². The gear here shown is of a well-known form, and of course could be replaced by any other driving mechanism that might be desired. At the left in Fig. 1 and supported by the same frame is the bale-chamber C, constructed after the fashion of what are known as "perpetual" bale-chambers, and are almost universally employed at the present day in baling-presses. In these bale-chambers, it is hardly necessary to state, the resistance which enables the plunger to compress the material is furnished by the friction between the sides of the chamber and the bale, and said chambers usually converge slightly toward the end from which the bales are continuously ejected. The sides of the bale-chamber shown here are held together by means of springs $c$ to enable them to yield slightly in case of unusual strain. This bale-chamber at its upper end terminates in a hopper D, into which the scrap-tin or other material is thrown by the operator. Above this hopper is seen the plunger or beater E, which is preferably a massive iron or steel block having a downwardly-convex face $e$ and guided in a vertical line by means of a rod D', upon which slides an eye $e^2$, formed in a projection upon the plunger. The rod D' is strengthened by means of a brace $d$. While this method of guiding the plunger is thought to be the best, there are of course many others which might be substituted.

Pivoted to the wheel or wheels B² by means of a pin $f$ is a pitman F, pivoted at its opposite end by means of a pin $f'$ to a walking-beam G. Said beam is itself fulcrumed upon a pin $h$, supported by an oscillating standard H, pivoted to the frame of the press at $h'$. The walking-beam is also pivoted to the plunger at $e'$. This method of supporting the fulcrum $h$ of the walking-beam allows it to accommodate itself to the vertical motion of the plunger E. As the tin is fed into the press, the plunger E, traveling up and down, forces it downward into the bale-chamber, and said plunger is, as before stated, rounded upon its under surface, and is also considerably smaller than the cross-section of the bale-chamber. This causes it to pound the central portion of the tin down, and as the scraps are usually of considerable length the ends will be left sticking upward about the plunger. When enough tin is in the press to form a bale, a division-block K is placed upon it. This division-block has a downwardly-concave surface, the edges thereof extending downward in the form of flanges, and as these flanges are placed upon the ends of the tin which have been left sticking upward about the plunger and the plunger then brought down upon the division-block, said ends are forced together in a tangled mass and firmly bind the bale with sufficient strength to retain it in shape without the addition of ties or other means for holding it together.

I prefer to make the division-block with a central opening, as shown in the drawings, as the same enables it to be made much lighter and also makes it more satisfactory in operation.

I claim as new and desire to secure by Letters Patent—

1. The combination, with the frame of a baling-press and suitable driving mechanism, of a plunger having a convex face and a division-block having a concave forward surface, substantially as described.

2. The combination, with the frame and driving mechanism of a baling-press, of a plunger having a cross-section less than that of the compression-chamber and a division-block concave upon its forward surface, substantially as described.

3. The combination, with the frame of a baling-press, of a plunger having a convex face smaller than the cross-section of the compression-chamber and a division-block having forwardly-projecting flanges about its edges and a hole in its back adapted to receive the rounded plunger, substantially as described.

ANDREW WICKEY.

Witnesses:
H. BITNER,
C. P. SMITH.